Aug. 10, 1954 P. A. HOWER 2,686,294
BEAT DETECTOR CIRCUIT
Filed April 3, 1946
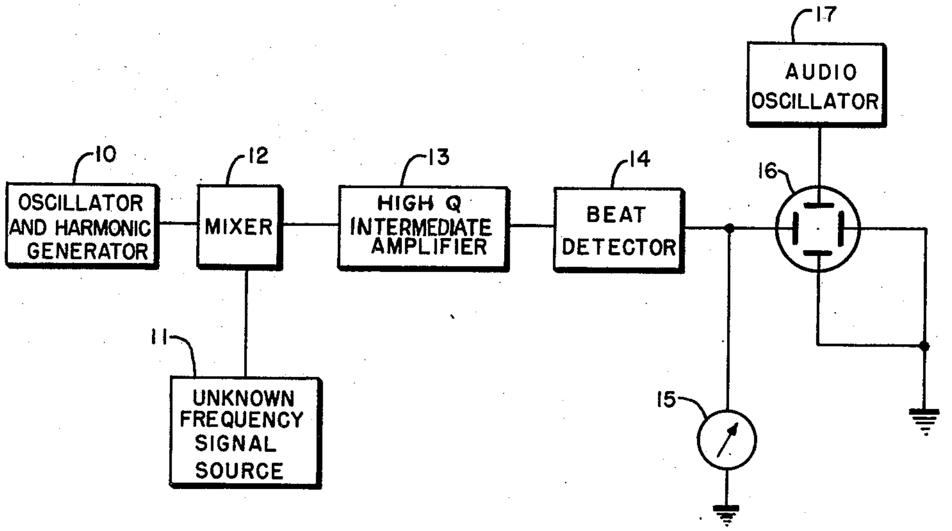
INVENTOR
PAUL A. HOWER
BY M. A. Hayes
ATTORNEY Patented Aug. 10, 1954

2,686,294

UNITED STATES PATENT OFFICE 2,686,294

BEAT DETECTOR CIRCUIT

Paul A. Hower, Brooklyn, N. Y., assignor, by mesne assignments, to the United States of America as represented by the Secretary of the Navy Application April 3, 1946, Serial No. 659,190

4 Claims. (Cl. 324—79)

This invention relates to frequency measurement and more particularly to beat detector circuits for use in frequency standards.

Heretofore accurate measurement of high frequency oscillations has involved the comparison of the unknown signal with the output of a fixed crystal oscillator or a harmonic thereof. Also, accurate frequency calibration has been accomplished by the use of a calibrated variable frequency source designed so that its harmonics within the frequency range to be covered, were over-lapping to give complete coverage over the desired frequency spectrum.

These methods of frequency measurement were not satisfactory because they required harmonics as high as the unknown frequency and because the amplifiers, due to the wide band pass required, were necessarily low Q, and hence of low gain.

It is an object of this invention to provide a beat detector method of accurately measuring an unknown frequency by using harmonics of a known frequency which are approximately half as high in frequency as the unknown.

Another object of this invention is to provide a beat detector method of accurate frequency measurement in which high Q, high gain amplifiers are used.

Another object of this invention is to provide a beat detector method of calibrating a frequency standard.

These and other objects will be apparent to one skilled in the art from the following specification when taken with the accompanying drawing which is a block diagram of an embodiment of the invention.

Referring to the drawing, oscillator and harmonic generator 10 and unknown stable signal source 11, the frequency of which is to be measured, are connected to mixer 12. The output of mixer 12 drives the high Q intermediate amplifier 13. A conventional beat detector 14 is driven by the output of intermediate amplifier 13, and the beat output is coupled to the vertical deflection plates of cathode ray tube 16. Zero beat indicator 15, preferably a voltmeter, is connected to the output of beat detector 14. A calibrated audio oscillator 17 is connected to the horizontal deflection plates of cathode ray tube 16.

As an example of the operation of the system illustrated, assume the output of oscillator and harmonic generator 10 is a 5 kc. signal and all the harmonics thereof. Unknown signal source 11 is assumed to be a stable oscillator, tunable from 1 megacycle to 1.4 megacycles. If the equipment is a frequency standard, the output of signal source 11 may be used to drive a series of frequency doublers and triplets for higher frequency oscillations. The input circuit of mixer 12 coupled to generator 10 is a tuned circuit capable of passing signals whose frequencies lie between 300 kc. and 700 kc., which covers the range between the 60th and 140th harmonics respectively of the above-mentioned 5 kc. fundamental. The output circuits of mixer 12 and intermediate amplifier 13 are of high Q and tuned to 700 kc. The signals at the output of intermediate amplifier 13 are thus from two sources. A first signal comprises the harmonic of generator 10 which are passed through the 700 kc. high Q system with changes only due to amplification. The other signals are heterodyned combinations of the signal from source 11 and some of the harmonics of generator 10 whose frequencies are within the pass band of the 300 kc. to 700 kc. band-pass input circuit of mixer 12. These signals are beat together in detector 14 to produce an audio frequency. The frequency of this audio beat signal is preferably limited between 0 and 5 kc. by a low pass filter (not shown) in detector 14. As the frequency of signal source 11 is changed, the audio signal frequency will change and will become zero at 2.5 kc. intervals of signal source 11. Zero beat indicator 15 indicates these audio signal frequency zero beat points. In general, the zero beat intervals occur at points equal to one-half the frequency of oscillator 10. That is, if the fundamental frequency of oscillator 10 is 2.5 kc., then as the frequency of oscillator 11 is changed, zero beat audio frequency signals occur every 1250 cycles change of oscillator 11.

It is therefore evident that the frequency of oscillator 11 must be known within certain limits. For the specific case described above, where the fundamental frequency of oscillator 10 is 5 kc., the frequency of oscillator 11 must be known within 5 kc. In general, the frequency to be determined must be known to within the frequency of the fundametal of the fixed frequency oscillator. Determination of the frequency within these limits can be accomplished by several well known methods.

As an example, assume that the unknown frequency to be determined is 1003.25 kc. First, the unknown frequency is found to be between 1000 kc. and 1005 kc. and is also found to be nearer 1005 kc. than 1000 kc. Second, the unknown frequency will be heterodyned with the 300 kc. harmonic of oscillator 10 to produce a signal whose frequency is 703.25 kc. and with the 305 kc. harmonic of oscillator 10 to produce a signal whose frequency is 698.25 kc. This 703.25 kc. signal is beat with the 700 kc. and 705 kc. harmonics of oscillator 10 in beat detector 14 to produce two audio signals of frequencies 3250 cycles per second and 1750 cycles per second respectively. The 698.25 kc. signal is beat with the 700 kc. and 695 kc. harmonics of oscillator 10 in beat detector 14 to produce two audio signals of frequencies 1750 cycles per second and 3250 cycles per second. There will be no lower frequency audio signals produced and the higher audio signals will be rejected by the low pass filter described above. Third, calibrated audio oscillator 17 is adjusted to obtain a simple lissajou figure (circle) on indicator 16. In the above example, a circle will be produced when oscillator 17 is tuned to either 1750 cycles per second or 3250 cycles per second. Since the original approximate frequency determination of source 11 indicated that the frequency of the signal was nearer 1005 kc. than 1000 kc., the final frequency determination is made by subtracting 1750 cycles per second from 1005 kc. or by adding 3250 cycles per second to 1000 kc. and obtaining 1003.25 kc.

While the specification describes what is now considered to be the most desirable form of the invention, it will be apparent to one skilled in the art that various changes and modifications may be made therein without departing from the scope of the invention as set forth in the appended claims.

What is claimed is:

1. Apparatus for accurately calibrating the frequency of a frequency standard oscillator comprising, a source of stable frequency oscillations with high harmonic content, a mixer energized by said standard oscillator and by selected harmonics of said stable frequency oscillator, said mixer having a high Q resonant tuned circuit output, an intermediate amplifier energized by said mixer output, said amplifier having high Q resonant tuned input and output circuits, said mixer output and amplifier tuned circuits being resonant at approximately one half the frequency of said standard oscillator, whereby said amplifier is energized with harmonics of said stable oscillations, a beat detector connected to said intermediate amplifier for obtaining the difference beat frequenices of said intermediate amplifier signals, a zero beat indicator connected to said beat detector, and means for accurately determining said beat frequencies.

2. Apparatus for accurately calibrating the frequency of oscillations of a frequency standard oscillator, the frequency of said oscillations being approximately known, comprising, a source of stable frequency oscillations and harmonics thereof, a mixer energized by said standard oscillator and by selected harmonics of said stable frequency oscillations to produce a pluralitiy of intermediate frequency signals, said mixer having a high Q resonant tuned circuit output, an intermediate amplifier connected to said mixer output, said amplifier having high Q resonant tuned input and output circuits, said mixer output and amplifier tuned circuits being resonant at substantially one-half the frequency of said standard oscillator whereby said amplifier is energized with harmonics of said stable oscillations and said intermediate frequency signals in a selected frequency band, a beat detector connected to said intermediate amplifier for obtaining the difference beat frequencies of said amplifier signals, a zero beat indicator connected to said beat detector, a cathode ray tube connected to said beat detector, and an accurately calibrated tunable audio oscillator connected to said cathode ray tube for accurately determining the frequencies of said difference frequency.

3. Apparatus for accurately measuring the frequency of a signal source of approximately known frequency comprising, a generator of stable frequency oscillations and harmonics thereof, means for heterodyning said signal of approximately known frequency with a selected band of harmonics of said oscillations, the upper of which is approximately one-half the frequency of said approximately known frequency and the lower of which when heterodyned with said approximately known frequency produces an intermediate frequency approximately equal to the aforesaid upper harmonic, a high Q intermediate amplifier coupled to said heterodyning means being tuned to the frequency of said upper harmonic, a beat detector coupled to said intermediate amplifier for heterodyning the signals passed by said intermediate amplifier to obtain difference frequencies thereof, and means for measuring the frequency of said difference frequencies.

4. In apparatus for measuring the frequency of an unknown signal source, means for generating stable frequency oscillations with high harmonic content, a mixer circuit, means coupling said unknown signal to said mixer circuit, tuned coupling means coupling signals from said oscillation generator to said mixer covering a band of frequencies of about one-half the frequency of said unknown signals, the heterodyning action of said mixer producing a plurality of intermediate frequencies, a high Q intermediate amplifier tuned to the upper frequency of the aforesaid coupling means, a high Q circuit tuned to the frequency of said intermediate amplifier coupling said mixer to said intermediate amplifier, the output of said intermediate amplifier thereby containing selected harmonics of said stable frequency oscillations and heterodyned combinations produced in said mixing circuit which are passed by said intermediate amplifier, a beat detector coupled to said intermediate amplifier for obtaining the audible difference beat frequencies of the frequencies contained in the output of said intermediate amplifier, and means for accurately determining said beat frequencies.

References Cited in the file of this patent

UNITED STATES PATENTS

| Number | Name | Date |
|---|---|---|
| 1,919,803 | Roetken | July 25, 1933 |
| 1,966,230 | Andrew | July 10, 1934 |
| 1,982,340 | Forbes | Nov. 27, 1934 |
| 2,076,361 | Beverage | Apr. 6, 1937 |
| 2,254,023 | Wright | Aug. 26, 1941 |
| 2,295,615 | Tucker | Sept. 15, 1942 |
| 2,321,315 | Peterson | June 8, 1943 |
| 2,324,077 | Goodale et al. | July 13, 1943 |
| 2,337,328 | Hathaway | Dec. 21, 1943 |
| 2,393,856 | Collins | Jan. 29, 1946 |
| 2,483,311 | Blok | Sept. 27, 1947 |